(12) United States Patent
Lapp et al.

(10) Patent No.: US 12,124,821 B2
(45) Date of Patent: Oct. 22, 2024

(54) METHOD AND SOFTWARE TOOL FOR MAKING EXECUTABLE SPECIFICATIONS IN THE SYSTEM DEVELOPMENT OR THE SYSTEM VALIDATION OF COMPLEX FUNCTIONAL SYSTEMS

(71) Applicant: Robert Bosch GmbH, Stuttgart (DE)

(72) Inventors: Andreas Lapp, Tamm (DE); Frank Prohaska, Stuttgart (DE); Markus Roessle, Vaihingen an der Enz (DE); Micha Muenzenmay, Stuttgart (DE); Stefan Schuchnigg, Vienna (AT)

(73) Assignee: ROBERT BOSCH GMBH, Stuttgart (DE)

( * ) Notice: Subject to any disclaimer, the term of this patent is extended or adjusted under 35 U.S.C. 154(b) by 101 days.

(21) Appl. No.: 17/780,213

(22) PCT Filed: Nov. 24, 2020

(86) PCT No.: PCT/EP2020/083173
§ 371 (c)(1),
(2) Date: May 26, 2022

(87) PCT Pub. No.: WO2021/105103
PCT Pub. Date: Jun. 3, 2021

(65) Prior Publication Data
US 2022/0413811 A1   Dec. 29, 2022

(30) Foreign Application Priority Data
Nov. 28, 2019  (DE) .................... 10 2019 218 458.8

(51) Int. Cl.
*G06F 8/35* (2018.01)
(52) U.S. Cl.
CPC .................... *G06F 8/35* (2013.01)

(58) Field of Classification Search
CPC ........................................................ G06F 8/35
(Continued)

(56) References Cited

U.S. PATENT DOCUMENTS

| 8,301,423 B1 * | 10/2012 | Aldrich | G06F 30/20 703/2 |
| 8,640,084 B2 * | 1/2014 | Murthy | G06F 11/3684 717/124 |

(Continued)

FOREIGN PATENT DOCUMENTS

| CA | 2854828 A1 * | 5/2013 | G06F 17/5009 |
| CN | 109976727 A | 7/2019 | |

OTHER PUBLICATIONS

Mori, Marco, et al. "Systems-of-systems modeling using a comprehensive viewpoint-based SysML profile." Journal of Software: Evolution and Process 30.3 (2018): e1878.*

(Continued)

*Primary Examiner* — Francisco J Aponte
(74) *Attorney, Agent, or Firm* — NORTON ROSE FULBRIGHT US LLP; Gerard A. Messina

(57) ABSTRACT

A computer-implemented method for making executable specifications in the system development and/or the system validation of a functional system for a target device for a motor vehicle. The method includes: providing a function system including at least one model view of the one or multiple functions for controlling or regulating a target device; providing a selection interface configured for selecting and changing a system part in a provided first model view by a user; transferring and displaying the system part selected and/or changed in the first model view in another model view for the user; providing a specification-and-approval interface designed for selecting and/or checking and/or further adapting the displayed system parts or changes in the other model view and for approving the (Continued)

changes to the system made in the first and/or in the other model view by the user; adopting in an automated manner the approved changes.

9 Claims, 4 Drawing Sheets

(58) Field of Classification Search
USPC .......................................................... 717/104
See application file for complete search history.

(56) References Cited

U.S. PATENT DOCUMENTS

| | | | | |
|---|---|---|---|---|
| 8,903,688 | B1* | 12/2014 | Aldrich | G06F 30/3323 |
| | | | | 716/136 |
| 9,075,510 | B1 | 7/2015 | Yan | |
| 9,176,640 | B1* | 11/2015 | Behboodian | G06F 8/34 |
| 9,177,452 | B1* | 11/2015 | Mosterman | G08B 6/00 |
| 9,183,120 | B1* | 11/2015 | Webb | G06F 8/76 |
| 9,558,301 | B1* | 1/2017 | Orqueda | G06F 11/3604 |
| 10,114,917 | B1* | 10/2018 | Venkataramani | G06F 30/34 |
| 10,268,525 | B2* | 4/2019 | Beckett | G06F 9/541 |
| 10,318,653 | B1* | 6/2019 | Khoo | G06F 11/3684 |
| 10,521,197 | B1* | 12/2019 | Ciolfi | G06F 8/34 |
| 10,657,208 | B2* | 5/2020 | Han | G06F 30/3323 |
| 10,719,645 | B1* | 7/2020 | Zhang | G06F 30/3323 |
| 10,866,789 | B1* | 12/2020 | Ciolfi | G05B 17/02 |
| 10,969,933 | B1* | 4/2021 | Rouleau | G06F 3/0482 |
| 11,042,675 | B2* | 6/2021 | Feng | G06F 30/20 |
| 11,216,604 | B2* | 1/2022 | Cheng | G06F 11/0793 |
| 11,354,463 | B1* | 6/2022 | Babaali | G06F 8/35 |
| 11,593,540 | B1* | 2/2023 | Popovici | G06F 9/455 |
| 11,734,480 | B2* | 8/2023 | Gupta | G06F 11/3447 |
| | | | | 703/21 |
| 2009/0179921 | A1 | 7/2009 | Raghavan et al. | |
| 2010/0251208 | A1* | 9/2010 | Murthy | G06F 8/34 |
| | | | | 717/104 |
| 2014/0278307 | A1* | 9/2014 | Hosey | G06F 30/20 |
| | | | | 703/6 |
| 2016/0292306 | A1* | 10/2016 | Migneault | G06F 30/00 |
| 2016/0357895 | A1* | 12/2016 | Hyde | G06N 7/01 |
| 2017/0061069 | A1* | 3/2017 | Drenth | G06F 30/15 |
| 2018/0060456 | A1* | 3/2018 | Phatak | G06F 9/5077 |
| 2019/0317733 | A1* | 10/2019 | Körner | G06Q 10/10 |
| 2019/0370028 | A1* | 12/2019 | Shi | G06F 9/5088 |
| 2019/0370155 | A1* | 12/2019 | Nanjundappa | G06F 11/3608 |
| 2020/0050533 | A1* | 2/2020 | Nanjundappa | G06F 9/455 |
| 2021/0311867 | A1* | 10/2021 | Fox | H04L 9/3247 |

OTHER PUBLICATIONS

NPL-CA 2854828 Merged Text (Translation) and Images.*
Shaofan Zhu et al. "A formal approach using SysML for capturing functional requirements in avionics domain"; Chinese Society of Aeronautics and Astronautics & Beihang University Chinese Journal of Aeronautics (2019), 32(12): 2717-2726.*
Moritz W'aschle et al. "Considering Functional Safety—supporting the development of automated driving vehicles by the use of Model-Based Systems Engineering"; 2022 17th Annual System of Systems Engineering Conference (SOSE).*
Pohl et al., "Advanced Model-Based Engineering of Embedded Systems—Extensions of The SPES 2020 Methodology," Springer, 2016, 303 Pages.
International Search Report for PCT/EP2020/083173, Issued Mar. 10, 2021.
Hessellund et al., "Guided Development With Multiple Domain-Specific Languages," Model Driven Engineering Languages and Systems, Lecture Notes in Computer Science, Springer Berlin Heidelberg, 2007, pp. 1-15. <https://www.academia.edu/22740587> Downloaded May 20, 2022.
Anonymous, "Data Transformation," Wikipedia, 2019, pp. 1-6. <https://en.wikipedia.org/w/index.php?title=Data_transformation&oldid=912776696> Downloaded May 20, 2022.
Anonymous, "Systems Modeling Language," Wikipedia, 2019, pp. 1-5. <https://en.wikipedia.org/w/index.php?title=Systems_Modeling_Language&oldid=915683974> Downloaded May 20, 2022.
Anonymous, "Model Transformation," Wikipedia, 2019, pp. 1-4. <https://en.wikipedia.org/w/index.php?title=Model_transformation&oldid=883567448> Downloaded May 20, 2022.
Gamma et al., "Design Patterns," 1995, Chapter 5, p. 293-301.

* cited by examiner

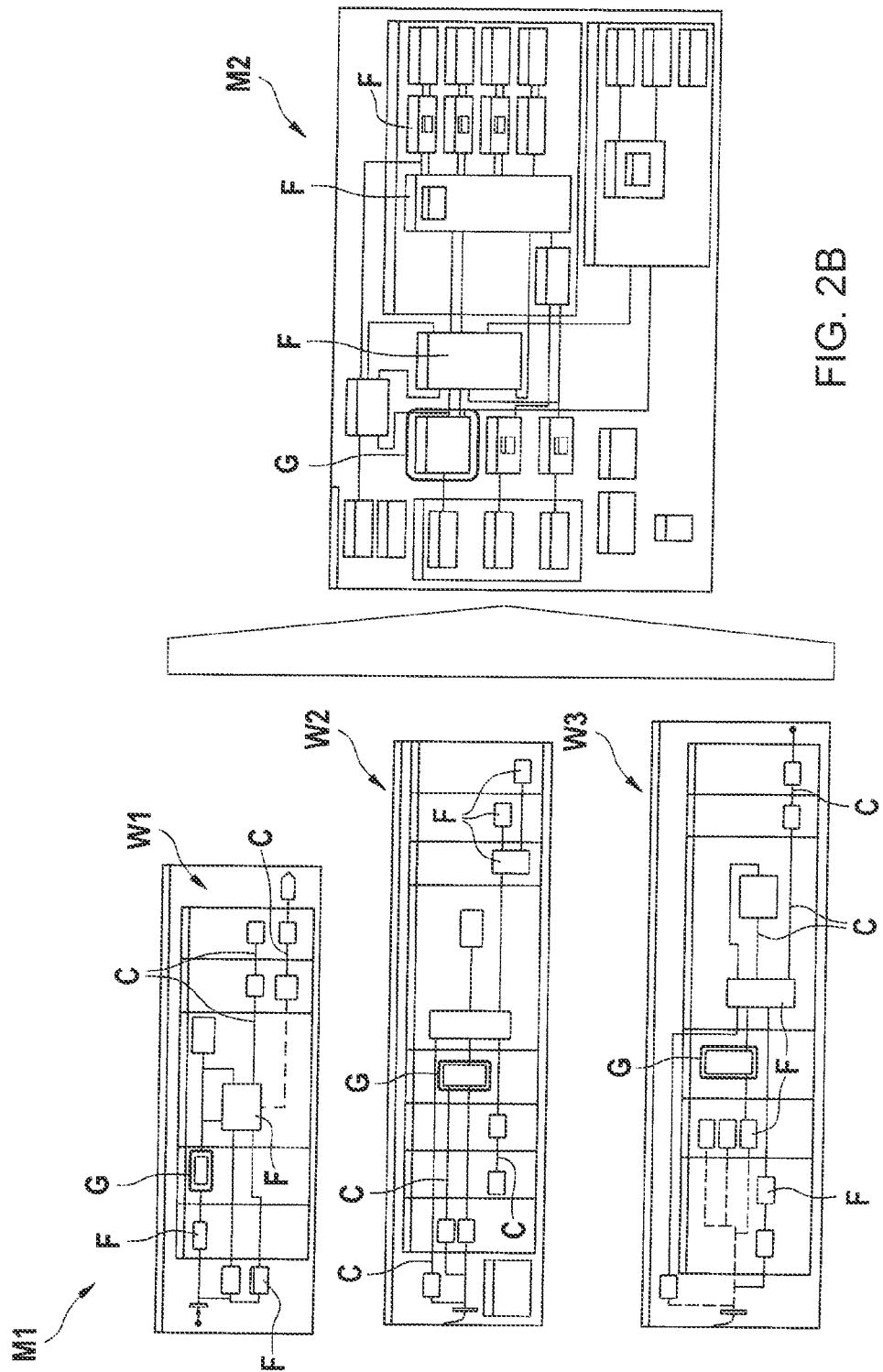

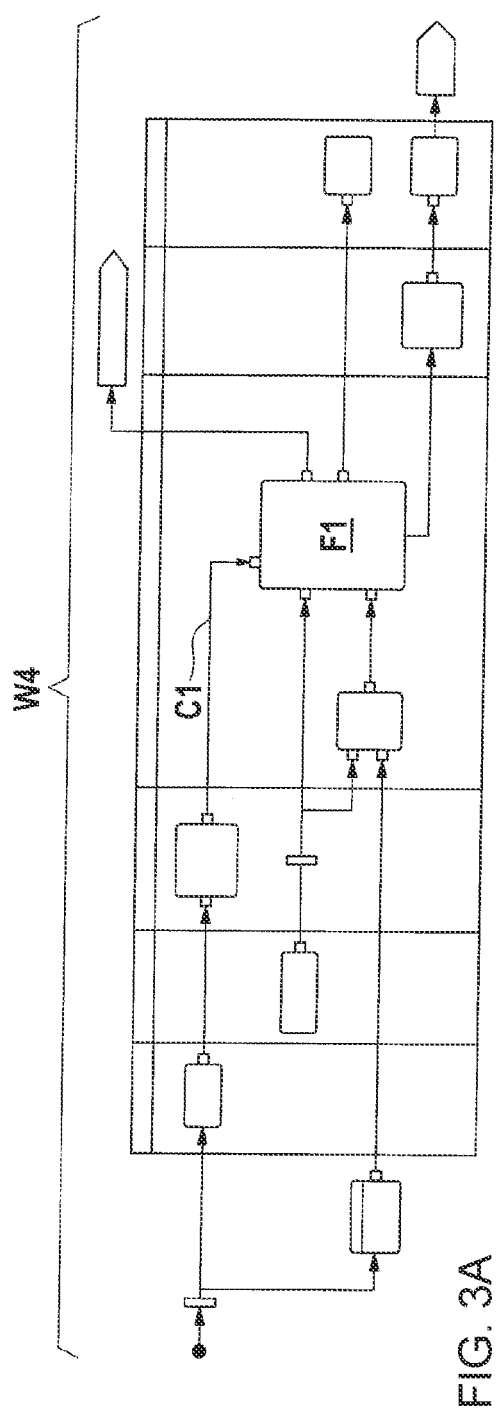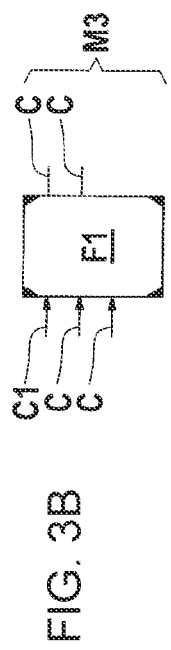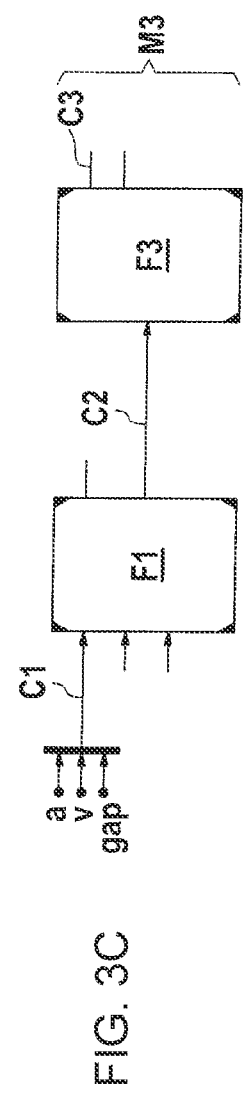
FIG. 3A
FIG. 3B
FIG. 3C

METHOD AND SOFTWARE TOOL FOR MAKING EXECUTABLE SPECIFICATIONS IN THE SYSTEM DEVELOPMENT OR THE SYSTEM VALIDATION OF COMPLEX FUNCTIONAL SYSTEMS

FIELD

The present invention relates to a computer-implemented method for making executable specifications in the system development and/or the system validation of a functional system for a target device, in particular, for a motor vehicle. It also relates to a corresponding software tool and to a control unit, which is configured to carry out the aforementioned method.

BACKGROUND INFORMATION

Model-based approaches for system development (Model-Based Systems Engineering, MBSE) such as, for example, a modeling platform described in "*Advanced Model-Based Engineering of Embedded Systems—Extensions of the SPES 2020 Methodology*," Springer, 2016, by Pohl, Klaus, Manfred Broy, Heinrich Daembkes and Harald Hönninger, are increasingly used in the development of complex functional systems, which implement, in particular, innovative functions in automotive applications for automated driving or for improving the energy efficiency of vehicles. In these approaches, software tools, for example, which make use of a graphic modeling language known as SysML or OMG SysML (OMG Systems Modeling Language, registered trademark, Object Management Group, Inc.) or E/E architecture development tools (E/E architecture in this case stands for "electrical-electronic architecture," which describes, in particular, which electrical and electronic components there are in the vehicle as well as interacting these with one another), such as, for example, PREEvision (registered trademark), in order in early phases of the system development to also describe the logical-functional correlations or the cause and effect correlations of complex systems in the form of functional or logical model views.

The existing conventional approaches of this type allow for a structural description of the systems in the form of functionalities and their dependencies. The latter are generally specified in the form of interface descriptions. Such a structural description of functional systems is also referred to herein as a static system description. A user or system developer in this case has at his/her disposal static model views such as, for example, a static functional system description including one or multiple functional cause-effect chains, which describe cause and effect correlations between effect parameters and target parameters relating to a physical functionality in the target device, or a functional architecture, in which functional identical parts of different cause-effect chains are aggregated and arranged according to functional affiliation in a hierarchical decomposition.

In addition to a structural description, a behavior description of a complex functional system is utilized, which is generally limited to causal correlations, sequences with time requirements or to the description of state-oriented systems with the aid of state machines. A description of the dynamic system behavior of time-continuous regulating systems or control systems takes place in conventional approaches decoupled from the structural description with the aid of specialized software simulation tools such as, for example, MATLAB/Simulink (registered trademark).

A coupling of a structural, static model view and of the dynamic behavior description in this case is left up to the user. Individual existing solutions are unidirectional and include, if at all, only a limited semantic coupling between individual modeling elements of the different model views. This is due to the following fact familiar to those skilled in the art: just as SysML tools are ill-suited for dynamic behavior description, so too, the software tools for dynamic behavior description fail to support all necessary static model views. For example, established artefacts to be modelled such as, for example, entire use cases, individual features and functions including their interfaces and variants, cause-effect chains in the static or dynamic description or E/E architecture are unable to be fully supported in each case by all three of the different software tools: first, a suitable requirements tool, second, SysML and third, MATLAB/Simulink—in early phases of the system development. Hence, it is also not an option in this case to describe all necessary models and views using a single tool in order, for example, to ensure the consistency between the different model views.

SUMMARY

According to the present invention, a computer-implemented method for making executable specifications in the system development and/or the system validation of a functional system, and a control unit configured to carry out the method, a corresponding software tool (computer program) and a machine-readable memory medium, on which it is stored, are provided. Specific embodiments of the present invention are disclosed herein. All further features and effects cited in the description for the method also apply with respect to the software tool and to the control unit and also vice versa.

According to one aspect of the present invention, a computer-implemented method is provided for the software tool-supported making of executable specifications in the system development and/or the system validation of an, in general, arbitrarily complex functional system, which may be designed for implementing diverse functionalities of the control and/or regulation of a target device, in particular, of a motor vehicle. "Software tool-supported" in this case means a novel software tool disclosed herein or further below used specifically for implementing the present method in its entirety, which may be installed and run, for example, in a computer, in a control unit or in another data processing device for system development and/or validation for carrying out the method.

A specification, which may be made using the present method, is for example, a modification or change of the system by a user, such as system developers or simulation experts. It may generate, in particular, a specific technical effect in the execution of the system in a suitable control unit of the target device such as, for example, a measurement, a display and/or a change of an instantaneous vehicle speed, engine speed, temperature or an arbitrary other physical operating parameter of a motor vehicle or of another target device. The functional system in this case includes one or multiple functions for controlling or regulating the target device. A functional system may, for example, be a driver assistance system, such as a lane-keeping assistant (LKS, lane-keeping support) or an adaptive cruise control (ACC), which may include functions such as receiving and/or ascertaining instantaneous movement parameters of the ego vehicle and/or other vehicles driving ahead or behind or overtaking and ascertaining adapted new movement parameters as a function thereof while prompting a correspondingly changed vehicle control, or an energy management system, etc.

"Executability" of the specification in this case means that a tracking by a user of changes produced by the specification for ensuring their consistency with the entire system and, for example, with predetermined technical requirements required for its executability on the target device may be ensured with the present method. For this purpose, an example embodiment of the present method includes the following steps:

- providing at least one model view, in particular, of a static functional system description and/or of another structural (or also referred to as static) description in the form of functionalities and their dependencies and/or of a dynamic behavior description (simulation model) of the functional system. A model view in this case means a model-based system description in a, for example, at least partially graphic, presentation format or language understandable to an appropriately qualified user. To provide the respective model views, the aforementioned or other conventional suitable software tools, for example, may be used for the system development or simulation such as SysML, PREEvision or MATLAB (all registered trademarks), which the software tool of the type described herein according to the present invention may access.
- providing a selection interface, which may be designed for selecting and/or changing a system part, which may include, for example, individual functions with associated interfaces or other modeling elements of the functional system, in a first model view provided by a user;
- transferring and displaying the selected and/or changed system part selected in the first model view, in particular, changes made and/or effects thereof and/or dependencies in the remaining system, in at least one, respectively different model view for a user;
- providing a specification interface and approval interface, which is designed for selecting and/or checking and/or further adapting the displayed changes in the at least one respectively other model view and for approving the changes to the system made by a user in the first and/or the at least one respectively other model view;
- adopting in an automated manner the approved changes to the system into the at least one respectively other model view and completing the system thus changed.

The term "user" may include herein both a single as well as multiple different persons, for example, a system developer, who contributes to the static functional system description, a simulation expert, who is tasked with the dynamic behavior description, and/or a group of specialists in various technical fields, who are responsible for the different vehicle domains such as, for example, engine control, driver assistance systems, power supply, air conditioning system, etc., which are affected by the functional system. Changes may be made in the present method by one single or by respectively different users not only in a single, but, if needed, also in multiple different model views, which function as the above first model view or as the aforementioned respectively other model views.

One idea of the present method is a semantic coupling implemented in the above transfer and display step of the changes made in one of the available model views by a user to the identical system in respectively other model views with a tool-based support of the user/adopter for tracking and ensuring the consistency of changes and/or their assessment, before they are approved for final adoption in the system via the specification-and-approval interface. A semantic coupling of the respectively changed model elements of the system between the different model views is understood herein to mean, in particular, a substantive, substance-dependent, logical and/or functional coupling of these model elements, which is able to, and ideally actually does, fully reflect, in particular, the actual technical effect of the respective change of the system in the respectively other model view. This may ensure a consistent tracking and assurance of the consistency of changes produced by the specification with the entire system and of predetermined technical requirements necessary for its executability on the target device. A semantic coupling of a static model view and of a dynamic behavior description, in particular, may be implemented in this case.

With the aid of such a semantic and software tool-supported coupling of static and dynamic model views not only in early phases of the system development (left, upper part of a so-called conventional V-model), but also for system validation, i.e., toward the right, upper part of the V-model, it is possible to overcome the deficits of conventional solutions described at the outset. The so-called V-model is an illustrative, graphic arrangement of successive development phases and validation phases of a system or of a software over time in the form of a "V," individual development phases on the left V-branch being contrasted with the respective test phases in the right V-branch. In this case, the temporally successive development phases are arranged, starting at the upper left-hand part of the "V" downward to the tip thereof, for example, from a requirements analysis (requirements engineering) via the development of a system architecture and an increasingly deeper detailed functional and technical specification down to an implementation basis for the software and hardware at the V-tip, which are subsequently validated on the right-hand side.

The present invention thus enables an executable specification of the functional system (simulation), whose consistency for the static or dynamic description may be ensured by a software tool-supported coupling of relevant modeling artefacts such as, for example, cause-effect chains or individual functions or their interfaces, etc. The approach described herein purposely also includes the adopter/user, who is able to check for the plausibility of, test and subsequently approve, modifications and their dependencies using his/her expert knowledge. In this case, an individual approval of respective changes, an approval of an entire predetermined set of artefacts including changes, and/or a blanket approval of all changes may, in particular, be supported by the specification-and-approval interface.

In addition to the functions selected and/or changed via the selection interface, their defined dependencies, in particular, interfaces and their description may, in particular, be transmitted/transferred in the present method into the respectively other model view and displayed therein to the user. In the process, the dependencies may be clearly displayed/shown to the user, for example, sorted according to type of relationship, according to output artefact and/or target artefact, etc.

In accordance with an example embodiment of the present invention, the first model view and the at least one respectively other model view may, in particular, include two or more of the following model views of the functional system:

- a static functional system description, which describes, in particular, at least one functional cause-effect chain, which describes cause and effect correlations between effect parameters and target parameters relating to a physical functionality in the target device;

a dynamic behavior description, which includes, in particular, a simulation of the dynamic behavior of the system generated using a simulation software;

a functional architecture, in which functional identical parts of different cause-effect chains are aggregated and arranged according to functional affiliation in a hierarchical decomposition;

a technical architecture, in which technical identical parts of different cause-effect chains are aggregated and arranged according to technical affiliation in a hierarchical decomposition;

a requirements engineering, which represents, in particular, technical requirements of the individual system parts.

The first model view in this case may, for example, be a static functional system description and one of the respectively other model views may be a dynamic behavior description, or vice versa. The method steps specified in general above may, in this case, be implemented, in particular, in such a way that:

via the selection interface, the user selects and/or changes an entire functional cause-effect chain in its static or dynamic description or one or multiple parts thereof;

during the transfer step, a function body is automatically generated in the dynamic behavior description from a static description for each of the selected and/or changed parts of the cause-effect chain using a simulation software and/or chosen from an existing function rump inventory and displayed to the user;

the specification-and-approval interface being designed, in particular, also for making changes in the respectively other model view, for example, in the dynamic behavior description, and, for feeding them back into the first model view or, in general, into at least one structural model view, for example, into the static functional system description and/or into the functional architecture, for checking for consistency with the remaining system.

Changes in this case may, for example, be changed, added or deleted functions or interfaces in the functional cause-effect chain and may also be accordingly displayed to the user as "changed," "added," or "deleted" in the first and in the respectively other model views.

The specification-and-approval interface in this case may further be designed to provide the user a choice between one or multiple of the following options of the system parts to be fed back:

all functions and interfaces;

all functions up to a level of detail to be defined by the user via the specification-and-approval interface and all associated interfaces or all primary functions including the associated interfaces;

functions and interfaces to be selected by the user via the specification-and-approval interface.

The primary functions in this case represent, for example, in a conventional manner, a functional scope, which is necessary for implementing a feature or a use case and describes the logical or physical correlations. In order to be able to make the aforementioned selection or to fulfill a corresponding request of the underlying software tool or of the control unit, the user can or must, for example, indicate in one of the model views whether the functions or interfaces are primary or secondary functions of the system. In this case, secondary functions may differ from the primary functions, for example, in a conventional manner, as follows:

A functional consideration of cause-effect chains and of a functional architecture, in general, necessarily includes the primary functions. If, for example, an iterative development is carried out as, for example, in the modeling platform SPES mentioned at the outset, then it may make sense to also add a functional description of secondary functions. Here, too, there are generally different possible solutions, which may be understood and assessed by the user with the aid of a functional consideration. It is important, however, that these functions are indicated as "secondary," since behind the consideration of particular secondary functions is a correspondingly qualified design decision-maker at the level of the technical architecture, who has the necessary technical knowledge such as, for example, that when using an internal combustion engine (ICE), a high-temperature cooling circuit is needed. If, for example, a safety concept is used, which decomposes safety objectives through redundancies, then redundant functions/functionalities are further also needed, which must first be distributed to suitable components, which in turn, may or must be indicated and considered as secondary functions. If a design decision changes at the technical level, then this has a potential influence on the secondary functions. These dependencies between a technical and function perspective are documented accordingly.

In this and in all other embodiments of the present method, the check in the specification-and-approval interface may therefore include a request of the user for contacting an organizational unit suitably qualified for the required check or approval. This may, in particular, also be supported by storing a telephone number and/or contact address of a correspondingly qualified user and, if necessary, of at least one representative in the software tool or in the software unit of the type described herein or by implementing an automated query and retrieval process of suitable contact data for the user.

Behind the above distinction or designation of primary and secondary functions is, among other things, the fact that functions in a real system always require an execution platform, on which they run. This platform employs suitable technologies such as, for example, microcontrollers, memory chips, power semiconductors, but also CAN bus, Ethernet, etc. This may be viewed as the actual task of technologies—to represent an execution platform for functions. A technology in this case is generally never perfect (not sufficiently performant, reliable, safe, etc.) and must therefore be continually checked for adherence to predetermined technical requirements (for example, functional safety), and adapted if necessary. One example of a secondary function is a thermal system for component cooling. This becomes necessary, for example, in order to avoid an overheating of a component, which unintendedly converts energy into heat due to poor efficiency.

In one specific example embodiment of the present invention, the method of the type described herein includes a transfer to the functional architecture and/or to a check of functional identical parts of different cause-effect chains implemented in the specification-and-approval interface for changes and their conformity. In the case of non-conformity, this may be restored for the user, optionally with an automatic request to make further changes in the relevant functions, i.e., to create conformity of the latter with their functional variants. In this case, the user may also be provided, in particular, automatic suggestions in the form of possible change options for achieving a conforming, functional variant. In a driver assistance system, for example, a functional identical part of two different cause-effect chains, one of which implements adaptive cruise control (ACC) and the other of which implements lane-keeping support (LKS), may be a shared function such as "detecting preceding, following and overtaking vehicles."

According to one further aspect of the present invention, a control unit is provided, which includes a processor configured to carry out a method of the type described herein. The control unit may, for example, be part of a computer or computer network suitable for the system development or the system validation.

According to one further aspect of the present invention, a software tool (computer program) previously cited further above in the description of the method is provided, which includes commands which, when the software tool is executed in a control unit of the type described herein or in another data processing unit, prompt the latter to carry out the method of the type described herein.

According to one further aspect of the present invention, a machine-readable memory medium is provided, on which such a software tool (computer program) is stored.

With the method of the type described herein in accordance with the present invention, it is thus possible to ensure, in particular, a semantic and software tool-supported coupling between a cause-effect chain (CEC) in the static functional system description and a dynamic behavior description (DVB). For this purpose, the method, in contrast to the related art described at the outset, includes in the system development and/or the system validation a bidirectional, automated transfer of modeling artefacts between CEC and DVB, which may, for example, include the following steps:

adoption of entire cause-effect chains or selected parts of a cause-effect chain.
providing/displaying an adaptable representation to the user, of which changes have been made in the respectively other model view and which effects this has in the host model view.
in this case, for example, artefacts such as functions or interfaces are marked as added, changed or deleted.
in the case of changed artefacts, the changes are shown.
The user is able to carry out an assessment of the changes with the aid of the specification-and-approval interface, before the final adoption thereof.
The user must approve in each case the adoption of changed artefacts according to CEC or DVB.
An individual approval, an approval of a set of artefacts and a blanket approval of all changes is supported.
Only approved changes are ultimately adopted into the respectively other model view.

In addition to the influence of the changes in CEC or DVB, the user in this case may also be shown, in particular, dependencies of modified artefacts to further model views of a model-based approach for system development, such as the aforementioned MBSE (Model-Based Systems Engineering). These may be, for example:

functional architecture;
requirements engineering; and/or
technical architecture.

The available information and the approach in this case are comparable to the above-described CEC and DVB coupling.

BRIEF DESCRIPTION OF THE DRAWINGS

The above aspects and their specific embodiments and specific designs are explained in greater detail below with reference to the examples represented in the figures.

FIG. 2A schematically shows an example of a static functional system description including three different cause-effect chains, which serve as a first model view in the method according to FIG. 1.

FIG. 2B schematically shows an example of a functional architecture corresponding to FIG. 2A.

FIG. 3A schematically shows a further example of a static functional system description for representing an ACC cause-effect chain, which serves as a first model view in the method according to FIG. 1.

FIG. 3B shows a schematically represented simulation framework for developing a dynamic behavior description with respect to a functionality selected by the user in FIG. 3A.

FIG. 3C shows a schematically represented refined simulation model, which is developed by a user in the provided simulation framework according to FIG. 3B.

DETAILED DESCRIPTION OF EXAMPLE EMBODIMENTS

All different specific embodiments, variants and specific design features of the method mentioned herein according to the above first aspect as well as of the corresponding software tool, of the control unit and of the machine-readable memory medium according to the above further aspects may be analogously implemented in the examples shown in FIG. 1 through FIG. 3D individually or in the above-mentioned combinations. Thus, they are all not repeated again below. The same applies accordingly to the term definitions and effects with respect to individual features already indicated further above, which are shown in the FIGS. 1 through 3D.

Figure 1:
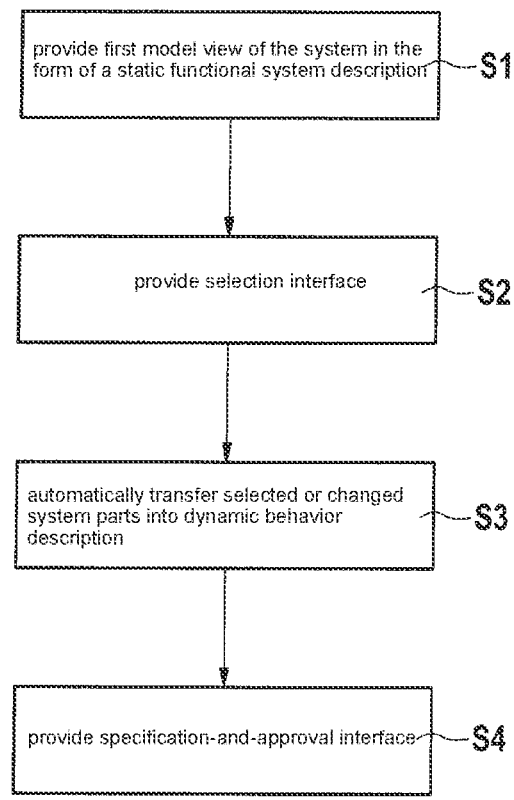
FIG. 1 shows a flowchart of one example of a method of the type described herein for making executable specifications in the system development and/or the system validation of a functional system, here, of a driver assistance system for a motor vehicle, in accordance with the present invention.

FIG. 1 shows in a flowchart a method of the type described herein for making executable specifications in the system development and/or the system validation of a functional system for a target device, in this example, of a driver assistance system for a motor vehicle. The method and some of its possible specific embodiments are described initially in general terms with reference to, among other things, the example of static model views M1 and M2 of a driver assistance system shown in FIGS. 2A and 2B, and subsequently further illustrated in a further example of an ACC controller development with reference to FIGS. 3A through 3D.

In a first step S1, the first model view of the system simplified and schematically represented in FIG. 2A is provided in the form of a static functional system description M1 which, in this example, includes three different cause-effect chains W1, W2, W3. First cause-effect chain W1 in this case describes a simple example of an adaptive cruise control (ACC), second cause-effect chain W2 describes a simple example of a lateral lane centering and third cause-effect chain W3 describes a simple example of a highway pilot. FIG. 2B shows an additional further static model view of this system in the form of a functional architecture M2 corresponding to FIG. 2A, which will be discussed again in detail further below.

New innovative functions and systems in automotive applications for automated driving or for improving the energy efficiency of vehicles are generally limited not to a single vehicle domain, but are complex cause-effect chains that extend across multiple vehicle domains. These complex cause-effect chains may be described, for example, with the aid of activity diagrams in the form of a sequence of activities F, which are also referred to herein as functions or functionalities, and their dependencies via interfaces C, as schematically indicated in FIG. 2A by individual blocks and lines connecting the former. This causal representation of the static dependencies with the aid of system development tools such as SysML (registered trademark) mentioned further above may be expanded by a dynamic behavior description M3 (not shown, a model element in FIGS. 3B and 3C schematically indicated), which represents another model view in the above sense, using specialized simulation tools such as MATLAB/Simulink (registered trademark) also mentioned further above.

The method according to FIG. 1 now enables a novel semantic and bidirectional coupling of individual model elements of these static and dynamic model views M1, M2, M3 to be specified individually supported by a corresponding software tool of the type described herein, on a shared system during the development and/or validation thereof. The uniform term "user" is representative in this case for all subsequently mentioned different persons that are involved in the system development or system validation within the scope of the present method, such as a system developer M1, who contributes to the static functional system description, a simulation expert, who is tasked with dynamic behavior description M3, and/or a group of specialists in different technical fields, who are responsible for different vehicle domains such as engine control or power supply, which are affected by the system.

In a further step S2 of the method following the above step S1, the user is provided a selection interface, which is designed for selecting and/or changing a system part in the first model view, for example, static functional system description M1 shown in FIG. 2A, by the user. Since it is not always practical to completely model a cause-effect chain due to the complexity or to the effort, the user in this case may select both an entire cause-effect chain W1, W2, or W3 or also only parts thereof.

In a further step S3, the system parts selected or changed by the user in step S2 in the first model view are automatically transferred into dynamic behavior description M3 and its display for the user. For this purpose, function bodies are automatically applied in MATLAB/Simulink for the selected parts in this example. In addition, the dependencies defined in the first model view, such as interfaces C, and their description of the selected/changed system parts are transferred (cf. FIG. 3A). These interfaces may be described in a conventional manner by suitable typical specifications/attributes such as, for example, name, logical physical size, value range, resolution, quantization, latency requirements and/or further specifications for "Quality of Service" and the like.

In the event that a simulation model already exists for the selected part of the cause-effect chain, the software tool implementing the method provides assistance to the user as to which functions already have a pendant in the simulation model. In addition, the user is made aware of changed, added or deleted functions in functional cause-effect chain W1, W2, or W3 and is displayed the type of change. For example, whether an interface has changed and where these changes lie.

Removed functions are characterized in steps S2 and S3 only as "deleted," and the user may decide in the further course of the method (step S4) how he/she will handle the situation. If needed, he/she may reflect back that this function is further needed, and may initiate a clarification, for example, by including further experts/users.

In one further step S4, the user is provided a specification-and-approval interface, which allows him/her to select and/or to check and/or to further adapt the displayed elements and changes in the dynamic and, if necessary, still further model views (such as, for example, functional architecture M2 according to FIG. 2B) and to approve the changes made. The function developer or simulation expert in this example may now develop, simulate and evaluate a dynamic behavior description M3, typically a DAE model (differential algebraic equation) on the basis of the aforementioned function bodies. For this purpose, he/she utilizes the interfaces already defined in the first, static model view and transferred in step S2 into the dynamic model view and supplements or changes these as needed. In this case, functions F may also be expanded, added or detailed in a hierarchical decomposition according to functional architecture M2.

In this case, the specification-and-approval interface in this example is also designed for an automatic feedback of the findings of dynamic behavior description M3 to static functional system description M1, for example, according to FIG. 2A and/or to functional architecture M2 according to FIG. 2B, in order to ensure that the changes carried out in the dynamic model view fit with the remaining function of the relevant cause-effect chain (in the simulation of a partial cause-effect chain) or to the function of the remaining system or of the rest of the vehicle (for example, to the other cause-effect chains), i.e., that no inconsistencies or conflicts occur here. For this purpose, these changes in the present example are fed back into functional architecture M2 and may thus be checked for consistency by the user.

In the process, the function developer or the simulation expert may, in particular, select which parts of the simulation model are to be fed back. In the specification-and-approval interface, for example, the following selection possibilities for the function feedback into static model view M1 and/or M2 may be supported:

All functions and interface are fed back, for example, into functional architecture M2;
All functions up to a level of detail to be defined by the user and all associated interfaces or all primary functions including the associated interfaces are fed back;
Functions and interfaces selected by the user are fed back.

If the simulation expert has made this selection taking primary and secondary functions (see details regarding their distinction indicated further above) in the specification-and-approval interface into account, then the software tool according to the present exemplary method carries out a comparison between the function bodies in MATLAB/Simulink, including their interfaces, and the functions in the cause-effect description in SysML. In the process, it may be automatically checked, for example, whether functions have been added or removed. It may further be automatically checked whether functions have been changed, i.e., whether changed function description or interfaces are present.

In this case, a case distinction between two following cases may be implemented by the method or by the corresponding software tool:

A complete cause-effect chain, for example, W1, W2, or W3 from FIG. 2A is fed back closed. In this case no further check of this cause-effect chain is necessary.

Parts of a cause-effect chain are fed back. In this case, the dependencies of changed, added or deleted functions to the remaining cause-effect chain are examined on the SysML side and these dependencies are presented to the user for assessment, i.e., displayed with a request for assessment in the specification-and-approval interface. The user in this case may confirm/approve each dependency individually or with the aid of collective approval, or has the possibility of reflecting back potential conflicts to the dynamic behavior description. Only approved changes are adopted.

In both cases, formal modeling guidelines, naming conventions, etc. may, in particular, also be automatically checked on the SysML side. The user is alerted to possible convention violations, etc., with a suitable display or assessment request in the specification-and-approval interface.

Changed functions in this case may not only have dependencies within a cause-effect chain. Functional architecture M2 represented by way of example in FIG. 2B may therefore be a further essential model view at the functional, static, or structural level. The aim of this static model view is, in particular, the identification of identical parts between cause-effect chains and the possibility of developing a functional variant concept.

FIG. 2A shows the aforementioned three different cause-effect chains W1, W2, and W3 and FIG. 2B shows the associated functional architecture. The latter aggregates functional identical parts and arranges them according to functional affiliation in a hierarchical decomposition. In this example, cause-effect chains W1 through W3 have a functional identical part G which, in the corresponding functional architecture, corresponds to a shared function, for example, "detecting preceding, following and overtaking vehicles." If in one of cause-effect chains W1, W2, or W3 the shared function is changed in the simulation, then a check may be implemented in the present method example also for the other two cause-effect chains, whether the changed function may be utilized or whether a functional variant is required here which, in turn, is usable for all three cause-effect chains W1, W2, and W3. For this purpose, the user may be made aware of these dependencies in the specification-and-approval interface. He/she may then potentially find, in turn, a common solution for the different cause-effect chains W1, W2, and W3 as a result of clear changes to the function.

However, not only the dependency of changes made to functional architecture M2, but also to adjacent development steps such as the requirements engineering or the technical architecture, may be implemented in in a similar manner the present method. All modelled dependencies may be displayed to the user in the specification-and-approval interface with a corresponding request for assessment and/or adaptation.

In order to clearly represent a potentially larger number of dependencies, the latter, for example, may be represented grouped according to type of relationship, according to output artefact and/or target artefact, etc.

Since multiple experts from different technical fields are generally required in order to assess possible consequences, corresponding organizational units may be stored in the present software tool, if necessary, also including their contact information, in order to enable a swift contact. A corresponding request may be implemented in the specification-and-approval interface so that, for example, particular types of changes cannot be released without their fulfillment.

The described method according to FIG. 1 is further illustrated below with reference to FIGS. 3A through 3D, which show an example of how, on the basis of a cause-effect chain W4 for an ACC controller, the development or further specification for a selected element of this cause-effect chain W4 is carried out with the aid of a simulation model, i.e., a dynamic behavior description M3, using the present method or software tool. Method steps S1 through S4 described with reference to FIGS. 2A and 2B apply analogously also to the example shown in FIGS. 3A through 3D and are therefore not repeated again in detail.

Figure 3D:
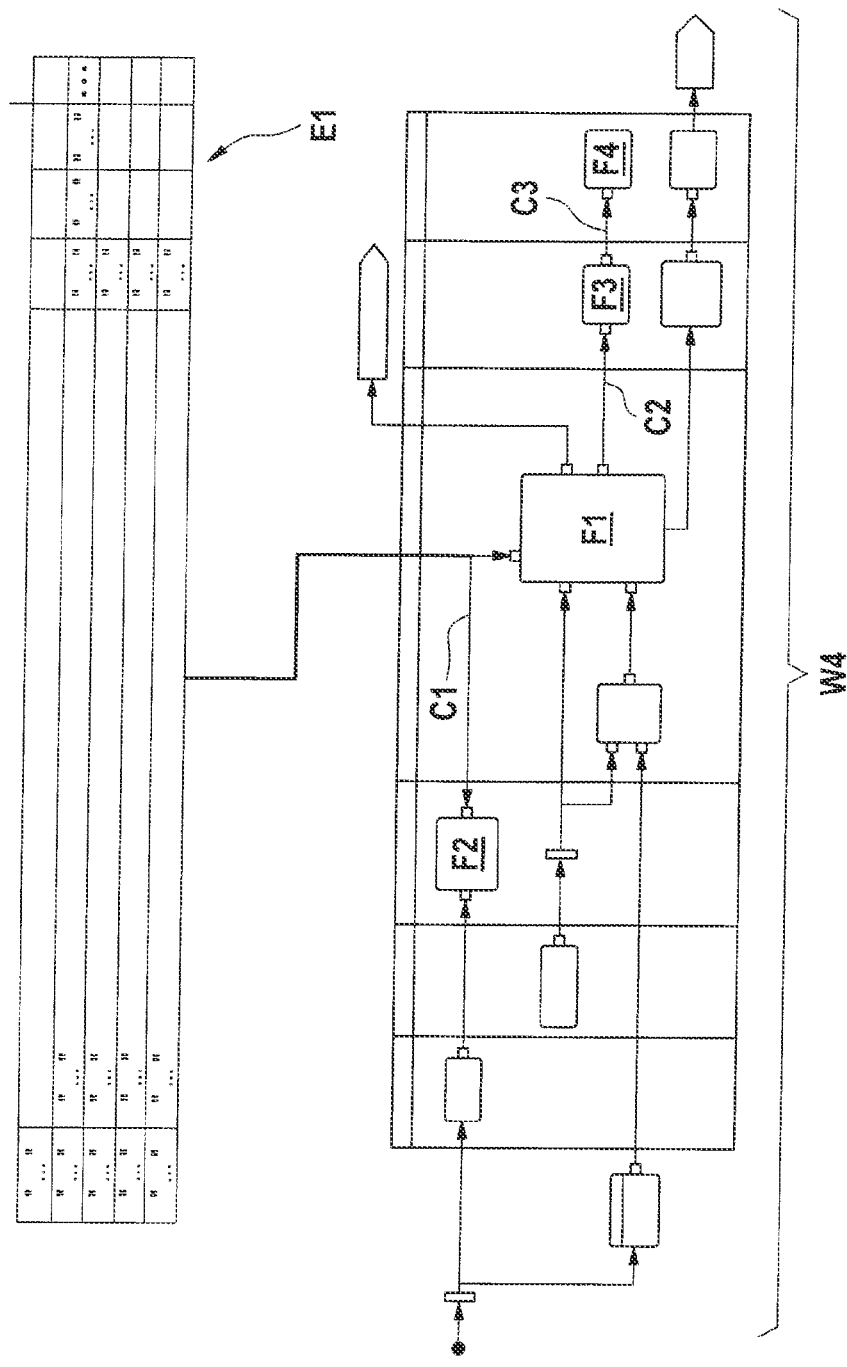
FIG. 3D shows a static functional system description as in FIG. 3A including changes to the system fed back and displayed to the user according to the method of FIG. 1.

As in the preceding example, here too, the findings obtained in the dynamic model view during the development is in the end fed back into output cause-effect chain W4, i.e., into static functional description M1 according to FIG. 3A or FIG. 3D. In the process, the user is made aware of implemented changes. The method according to FIG. 1 or the corresponding software tool, which runs on a computer, supports in this case the following system development steps of a respective "user":

1. The system architecture describes the functional correlations of feature ACC in the form of a cause-effect chain W4, as represented simplified in FIG. 3A. The resultant first model view of this feature or system in the form of a static functional system description M1 is provided to the further users in the above step S1 of the method according to FIG. 1.

2. The function developer for a function or functionality F1, in this example, "computing the ACC trajectory," within this feature selects this functionality F1 in the above first model view via the selection interface provided in above method step S2.

Supported by the software tool, a simulation framework schematically represented in FIG. 3B for developing a dynamic behavior description M3 with respect to functionality F1 is now automatically generated in subsequent method step S3. In this case, all pieces of information contained in the cause-effect description of the first model view according to FIG. 3A for functionality F1 are automatically also adopted such as, for example

- interfaces C, C1, etc. including their signatures
- qualitative requirements of interfaces C, C1, etc., such as, for example, quantitative information regarding low, average or high volumes of data, clock cycle requirements and latency requirements; information regarding functional safety and the like;
- attributes, which describe functionality F, F1 in greater detail, such as, for example, information regarding functional safety, the operation system, the computing power, the memory; and the like;
- textual descriptions of functionality F, F1, etc.
- references to requirements intended to implement this functionality F, F1, etc.

3. As shown in FIG. 3C, the function developer is now able to develop a refined simulation model in the provided simulation framework, which defines the dynamic behavior of functionality F1. For this purpose, the function developer introduces, for example, further simulation elements that describe the behavior, and connects these to the available input variables and output variables. The developer describes these variables and defines the value ranges, resolution, unit, time requirements, etc. on the basis of the simulation. If needed, the developer may introduce further variables such as, for example, the separation of the input variable C1, which in this example, indicates "object data," into an acceleration a, velocity v and distance gap to the preceding vehicle.

4. If needed, the function developer in this case refines not only functionalities such as F1, which are already included in cause-effect chain W4, but also introduces new functions such as, for example, newly inserted function F3 "Preparation of display data for ACC" in FIG. 3D. This also results in new dependencies. Thus, interface C3 for "display data" is reintroduced.

5. If the maturity of the dynamic behavior description M3 has reached a sufficient state, the function developer, supported by the tool, i.e. in the specification-and-approval interface provided in above method step S4, may have his/her changes fed back again into static functional model view M1 as schematically represented in FIG. 3D. In the first step, the implemented changes in functional first model view M1 are only identified, and must be approved via the specification-and-approval interface for final adoption in the feature/system ACC controller.

6. The user, for example, in turn the system architect, in this case obtains in the present method a suitable representation of which changes have been made in the respectively other model view and which effects this has in the host model view. This is illustrated in the present example in FIG. 3D in static functional model view M1:

For example, artefacts such as functions F, F1, etc., or interfaces C, C1, etc., are marked as added, changed or deleted.

In the case of changed artefacts, the changes are represented.

Thus, in FIG. 3D selected and/or changed output functionality F1 is identified and likewise changed input variable C1. Here, the refined interface specification is displayed to the user by an explanatory box E1.

In addition, the user is made aware by the display according to FIG. 3D that this interface change also influences functionality F2, which must provide this information, in this case, changed input variable C1. Thus, the system architect may coordinate these changes to function F2 with the responsible party prior to their approval.

Functionality F3 and its output variable C3 are characterized as new. Here, the system architect must assess the necessity thereof and, if necessary, check whether there is a comparable functionality and identical parts G may be utilized. In any event, the effects on a subsequent functionality F4 in cause-effect chain W4 are to be assessed and, if necessary, coordinated with the party responsible for the function for F4.

7. This allows the system architect to assess the identified changes, if needed, together with the parties responsible for the function of relevant functionalities F1, F2, F3, and F4. The system architect may now decide which changes he/she approves or, if needed, consults with the function developer and deliberately does not adopt changes.

8. In this example, an individual approval, an approval of a set of artefacts and a blanket approval of all changes is supported in the specification-and-approval interface.

9. Only approved changes are ultimately adopted in the respectively other model.

Areas of application of the method of the type described herein are not limited to the system development. For example, the above-described automated coupling between static functional view and dynamic behavior description may be used for different development activities within the V-model described further above. For one, the method or the software tool implementing the method may be used for developing a single system function or sub-function, since a change tracking and control are made possible by semantic, software tool-supported coupling of individual model view elements. Thus, the approach contributes to the detailing of the system design and to the developing of an implementation. It may, however, equally be used for developing an automated system test or integration test or for ascertaining suitable stimuli and associated system responses in the validation stage.

What is claimed is:

1. A computer-implemented method for making executable specifications in system development and/or system validation of a functional system for a target device for a motor vehicle, comprising the following steps:
   providing at least one model view of the functional system including one or multiple functions for controlling or regulating a target device;
   providing a selection interface, which is configured for selecting and changing a system part in a provided first model view by a user, the first model view including a static functional system description, which includes at least one functional cause-effect chain, which describes cause and effect correlations between a physical functionality in effect parameters and target parameters relating to the target device, wherein the selecting and changing the system part includes selecting and changing at least a part of a functional cause-effect chain in the static functional system description;
   transferring and displaying the system part selected and/or changed in the first model view, including changes made and/or their effects and/or dependencies in the remaining system, in at least one other model view for the user, the at least one other model view including a dynamic behavior description, which includes a simulation of a dynamic behavior of the system of the target device generated using a simulation software, wherein for the selected and changed at least the part of the functional cause-effect chain, a function body is automatically generated in the dynamic behavior description of the at least one other model view;
   providing a specification-and-approval interface, which is configured for selecting and/or checking and/or further adapting the displayed system parts or changes in the at least one other model view, and for approving the changes to the system made in the first and/or the at least one other model view by the user;
   adopting in an automated manner the approved changes to the system into the at least one other model view.

2. The method as recited in claim 1, wherein in addition to the selected and/or changed functions, their defined dependencies, including interfaces and their description, are also transferred into the other model view and displayed therein to the user.

3. The method as recited in claim 1, wherein the first model view and the at least one other model view include two or more of the following model views of the functional system:
   a functional architecture in which functional identical parts of different cause-effect chains are aggregated and arranged according to functional affiliation in a hierarchical decomposition;
   a technical architecture, in which technical identical parts of different cause-effect chains are aggregated and arranged according to technical affiliation in a hierarchical decomposition;
   a requirements engineering, which represents technical requirements of individual system parts.

4. The method as recited in claim 3, wherein:
the user selects and/or changes an entire functional cause-effect chain or one or multiple parts thereof via the selection interface in the static functional system description;
during the transfer step, for each of the selected and/or changed parts of the cause-effect chain, a function body is automatically generated in the dynamic behavior description using a simulation software and/or chosen from an existing function body inventory and displayed to the user;
the specification-and-approval interface is also configured for making changes in the dynamic behavior description and for feeding them back into the static functional system description and/or into the functional architecture for checking for consistency.

5. The method as recited in claim 4, wherein the specification-and-approval interface is further configured to provide the user with a selection between the following options of system parts to be fed back:
all functions and interfaces;
all functions up to a level of detail to be defined by the user via the specification-and-approval interface and all associated interfaces or all primary functions with the associated interfaces;
functions and interfaces to be selected by the user via the specification-and-approval interface.

6. The method as recited in claim 1, further comprising a transfer into a functional architecture and/or a check of functional identical parts of different cause-effect chains included in the specification-and-approval interface for changes and, in the case of non-conformity, a display to the user with an option of providing a change option to a conforming functional variant.

7. The method as recited in claim 1, wherein the check in the specification-and-approval interface includes a request by the user for contacting an organizational unit qualified for a required check or approval.

8. A control unit including a processor configured for making executable specifications in system development and/or system validation of a functional system for a target device for a motor vehicle, the control unit configured to:
provide at least one model view of the functional system including one or multiple functions for controlling or regulating a target device;
provide a selection interface, which is configured for selecting and changing a system part in a provided first model view by a user, the first model view including a static functional system description, which includes at least one functional cause-effect chain, which describes cause and effect correlations between a physical functionality in effect parameters and target parameters relating to the target device, wherein the selecting and changing the system part includes selecting and changing at least a part of a functional cause-effect chain in the static functional system description;
transfer and display the system part selected and/or changed in the first model view, including changes made and/or their effects and/or dependencies in the remaining system, in at least one other model view for the user, the at least one other model view including a dynamic behavior description, which includes a simulation of a dynamic behavior of the system of the target device generated using a simulation software, wherein for the selected and changed at least the part of the functional cause-effect chain, a function body is automatically generated in the dynamic behavior description of the at least one other model view;
provide a specification-and-approval interface, which is configured for selecting and/or checking and/or further adapting the displayed system parts or changes in the at least one other model view, and for approving the changes to the system made in the first and/or the at least one other model view by the user;
adopt in an automated manner the approved changes to the system into the at least one other model view.

9. A non-transitory machine-readable memory medium on which is stored a software tool for making executable specifications in system development and/or system validation of a functional system for a target device for a motor vehicle, the software tool, when executed by a control unit or data processing unit, causing the control unit or data processing unit to perform the following steps:
providing at least one model view of the functional system including one or multiple functions for controlling or regulating a target device;
providing a selection interface, which is configured for selecting and changing a system part in a provided first model view by a user, the first model view including a static functional system description, which includes at least one functional cause-effect chain, which describes cause and effect correlations between a physical functionality in effect parameters and target parameters relating to the target device, wherein the selecting and changing the system part includes selecting and changing at least a part of a functional cause-effect chain in the static functional system description;
transferring and displaying the system part selected and/or changed in the first model view, including changes made and/or their effects and/or dependencies in the remaining system, in at least one other model view for the user, the at least one other model view including a dynamic behavior description, which includes a simulation of a dynamic behavior of the system of the target device generated using a simulation software, wherein for the selected and changed at least the part of the functional cause-effect chain, a function body is automatically generated in the dynamic behavior description of the at least one other model view;
providing a specification-and-approval interface, which is configured for selecting and/or checking and/or further adapting the displayed system parts or changes in the at least one other model view, and for approving the changes to the system made in the first and/or the at least one other model view by the user;
adopting in an automated manner the approved changes to the system into the at least one other model view.

* * * * *